Dec. 1, 1953  A. C. VIVIAN  2,660,880
APPARATUS FOR USE IN DETERMINING THE ULTIMATE TENSILE
STRENGTH OF STEEL UNDER IMPACT CONDITIONS
Filed Dec. 10, 1949  2 Sheets-Sheet 1
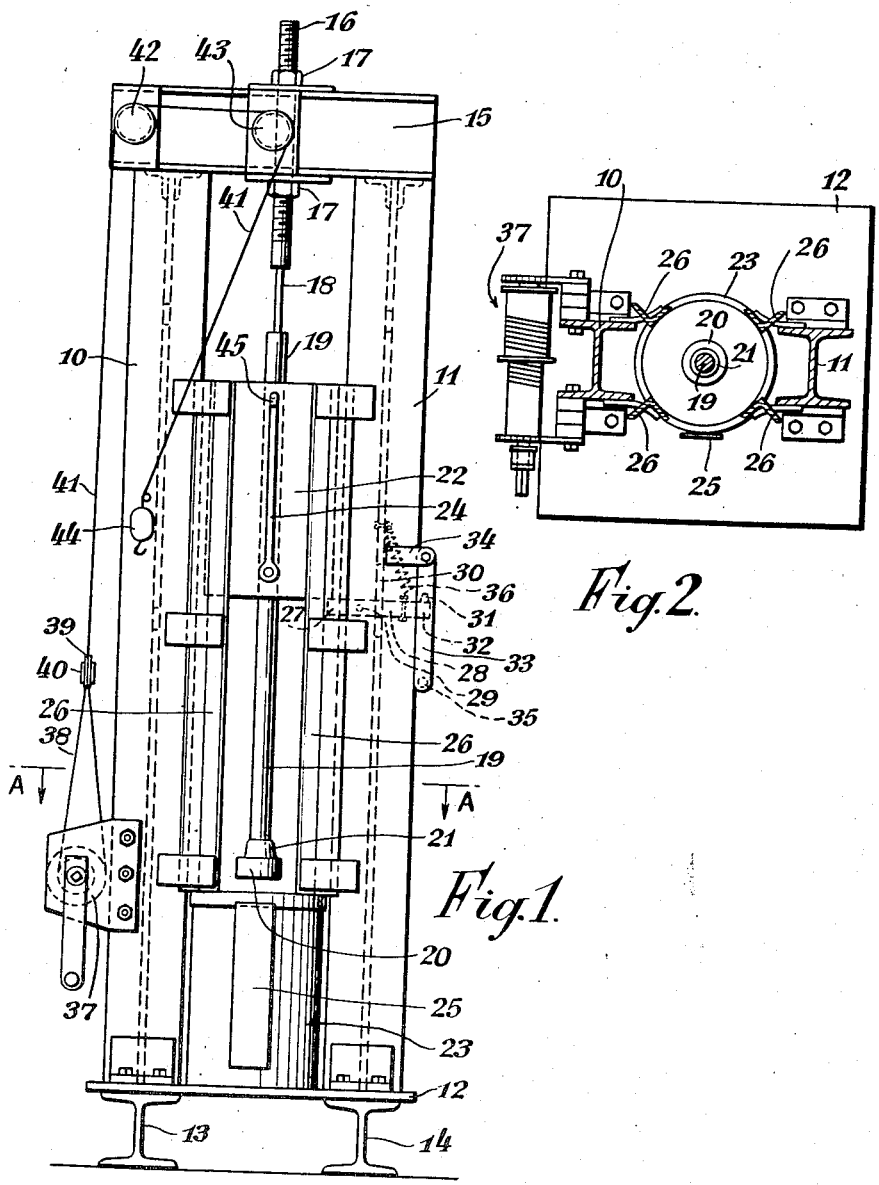
INVENTOR
ARTHUR CECIL VIVIAN
BY
Morgan, Finnegan & Durham
ATTORNEYS.

Dec. 1, 1953
A. C. VIVIAN
2,660,880
APPARATUS FOR USE IN DETERMINING THE ULTIMATE TENSILE
STRENGTH OF STEEL UNDER IMPACT CONDITIONS
Filed Dec. 10, 1949
2 Sheets-Sheet 2
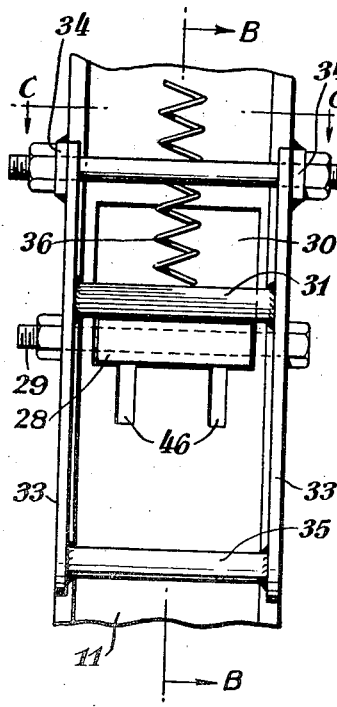
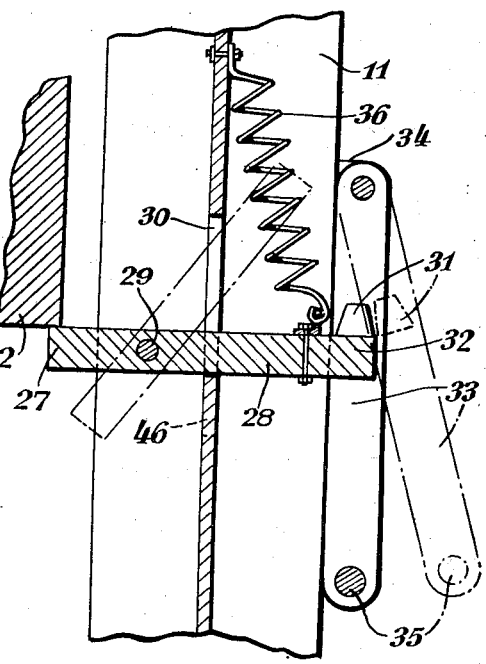
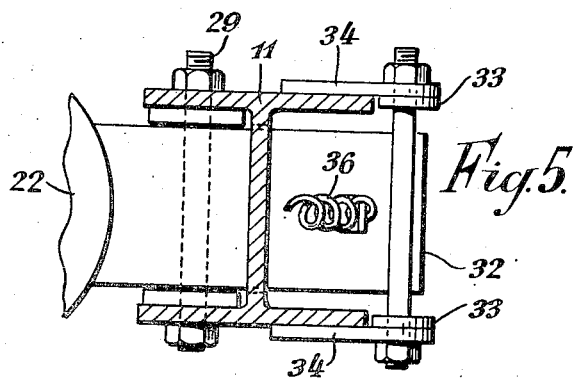
INVENTOR
ARTHUR CECIL VIVIAN
BY
Morgan, Finnegan + Durham
ATTORNEYS.

Patented Dec. 1, 1953

2,660,880

UNITED STATES PATENT OFFICE 2,660,880

APPARATUS FOR USE IN DETERMINING THE ULTIMATE TENSILE STRENGTH OF STEEL UNDER IMPACT CONDITIONS

Arthur Cecil Vivian, London, England

Application December 10, 1949, Serial No. 132,227

5 Claims. (Cl. 73—12)

The invention relates to apparatus for use in determining the ultimate tensile strength, effective ductility and reduction in area of steel and like materials under impact conditions.

According to the invention, a test bar of the material is stretched and fractured by means of a weight in its fall through a predetermined distance, and the residual energy of the weight, after fracture of the test bar, is measured by means provided for that purpose in order that the energy required to stretch and fracture the test bar may be determined.

According to the invention furthermore, apparatus for use in determining the ultimate tensile strength, effective ductility and reduction in area of steel and like materials, comprises a weight which is allowed to fall a predetermined distance and stretch and fracture a test bar of the material, and means for measuring the residual energy of the weight, after it has fractured the test bar, in order that the energy required to stretch and fracture the test bar may be determined.

Advantageously the weight is cylindrical in shape and the means for measuring its residual energy after it has stretched and fractured the test bar comprises an air cylinder into which the weight falls and in which it acts as a piston, the depth to which the weight plunges within the air cylinder before coming to rest being proportional to the residual energy of the weight.

According to one embodiment of the invention, the apparatus comprises a rigid frame having an upper suspension bar from which the test bar of the material depends, and an anvil bar which in turn depends from the test bar and which is formed with an enlarged end or anvil, the anvil bar passing with easy sliding fit through a central vertical hole in the weight which is supported, by means attached to the frame, at the predetermined distance above the anvil, said means being rapidly removable to allow the weight to fall freely on to the anvil to stretch and fracture the test bar.

Conveniently, the weight may have attached to it recording means, such as a pen arm, which records on a chart, positioned adjacent the air cylinder, the distance to which the weight plunges within the air cylinder. The weight may advantageously be adjustable to one of several different values.

The invention will now be described by way of example with reference to the accompanying drawings, in which:

Figure 1 is a front elevation of the apparatus,

Figure 2 is a sectional plan through the line AA in Figure 1,

Figure 3 is a side elevation of the release mechanism on an enlarged scale,

Figure 4 is a section through the line BB in Figure 3, and

Figure 5 is a sectional plan through the line CC in Figure 3.

The apparatus consists of two vertical steel stanchions 10 and 11 secured to a base plate 12, which is supported by two horizontal steel beams 13 and 14. The stanchions 10 and 11 have secured to their upper ends a horizontal steel beam or transom 15 having a central vertical hole through which passes a suspension bar 16 screw threaded along part of its length so that it may be rigidly secured to the transom 15 by means of nuts 17. A test bar 18 is attached to the lower end of the suspension bar 16, in known manner, so that it hangs freely, and an anvil bar 19 is similarly attached to the lower end of the test bar 18. The lower end of the anvil bar 19 is enlarged to form an anvil 20 and a Morse taper 21 is formed between the anvil bar and anvil. A cylindrical weight or tup 22, having a central hole, with a Morse taper bush secured to its lower end, is mounted in sliding contact on the anvil bar 19 in such manner as to be releasable to fall a predetermined distance on to the anvil 20 to cause stretching and fracture of the test bar. In so falling the Morse taper of the anvil bar makes an air-tight fit with the Morse taper bush. In its further movement after fracture of the test bar, the tup and anvil assembly fall into an air cylinder 23 which rests on the base plate 12. The air cylinder 23 is formed to a very slightly greater internal diameter than the external diameter of the tup 22, and has a U-leather provided to prevent escape of air, the tup acting as a piston in the air cylinder and being brought to rest by compression of air. The tup has attached to it a pen arm 24 which records on a chart 25, positioned in front of the air cylinder, the depth to which the tup plunges within the air cylinder. In order to ensure that the tup falls directly into the air cylinder without deviation, guide plates 26 are provided, spaced at equal distances around the tup and extending from the uppermost position of the top of the tup to the top of the air cylinder.

The tup is supported at the predetermined distance above the anvil by the end 27 of a plate 28 which is pivoted by means of the pivot pin 29 extending between the opposite flanges of the stanchion 11. The plate 28 passes through a hole 30 in the web of the stanchion 11, the hole being large enough to allow limited rotation of the plate into a position where the end 27 is out of the path of the falling tup. In order to support the tup, the plate 28 is held in the horizontal position by means of a catch bar 31 which overlies the other end 32 of the plate 28. The catch bar 31 extends horizontally between a pair of links 33 which are pivoted at one end to attachments 34 on the stanchion 11. The links 33 are provided with a handle 35 extending horizontally between their other ends. A spring 36 is provided to urge the plate 28 to rotate about the pivot 29 in an anticlockwise direction (as viewed from the front of the apparatus). When the handle 35 is pulled away from the stanchion 11 so as to move the catch bar 31 away from the end 32 of the plate 28, the spring 36 rotates the plate 28 about the pivot 29, at a faster rate than the pressure of the tup on the end 27 would if no spring were provided, and so leaves the tup to fall freely on to the anvil.

In order to hoist the tup, a differential winch 37 is provided having a wire rope 38 passing over a pulley 39 with a cross piece 40. Two wire ropes 41 (at the front and back of the apparatus respectively) are attached at one end to the cross piece 40 and pass over pulleys 42 and 43 on either side of the transom 15. The wire ropes 41 are attached at their other ends to hooks 44, which may be made to co-operate with lugs 45, on opposite sides of the tup 22, when it is required to hoist the tup.

The apparatus should be erected on a solid concrete floor, levelled carefully, grouted in and securely bolted down without interposition of any timber or other shock absorbing medium.

By means of preliminary tests with each of the weights to which the falling tup may be made up, using a calibration bar of known breaking energy, a calibration chart is drawn so that for any depth of movement of the tup, the energy used to break a test bar can be read off. This is achieved from a knowledge of the total energy of the falling parts and the depth to which they come to rest momentarily during the calibration.

Thus if,

W = weight of falling tup,
$W_a$ = weight of anvil assembly,
H = initial height of the falling tup above the anvil,
$H_c$ = movement of tup and anvil assembly from initial position of anvil to top of cylinder,
$H_y$ = plunge of tup and anvil assembly into cylinder, then total energy of system $$= WH + (W+W_a)(H_c+H_y)$$

and if the residual energy is denoted by R, the losses by L and the energy used to stretch and/or break the test bar by Q, then $$Q = WH + (W+W_a)(H_c+H_y) - R - L$$

Losses comprise elastic deformation of supporting frame and of anvil bar, and friction losses. The energy used in accelerating the anvil bar assembly is not lost. The friction losses and any losses due to elastic deformation of the frame and anvil bar are practically the same during calibration as during the breaking of a test bar. The depth recorded during calibration is less than it would be if the system were frictionless. The depth recorded when breaking a test bar is also less by the same amount for a given depth. The calibration chart is, therefore, independent of these friction losses.

A preferred form of calibration bar consists of two half bars of the same dimensions as a test bar and joined at the middle by a loop of copper wire. Alternatively a cast iron calibration bar or a high tensile steel notched bar having a very small breaking energy may be used. The breaking energy of this calibration bar is determined by trial and error by dropping a known weight down the anvil bar with the calibration bar in place, and ascertaining the weight which just breaks it.

The ultimate tensile strength is determined from the measured values of energy to break test bar and the total stretch of the bar which is obtained when the effective ductility is measured. The energy to break is represented to appropriate scale by the area under the nominal stress-strain diagram. This area is a little less than the product of cross-section of test bar, ultimate tensile strength and total stretch. The amount by which it is less is determined by the shape of the nominal stress-strain curve, which is in turn determined by the effective ductility. The ultimate tensile strength is then calculated from the above noted measured quantities and the rectangular area reduction factor appropriate to the effective ductility.

I claim:

1. Apparatus for determining the ultimate tensile strength, effective ductility and reduction in area of steel and the like comprising a rigid frame having support means from which a test bar is adapted to depend, an anvil bar having an anvil at its lower end, said anvil bar being adapted to be connected to the lower end of said test bar, and an annular weight slidably mounted on said frame surrounding said anvil bar and slidable therealong and releasably supported on said frame at a predetermined distance from said anvil, said weight being provided with a recess at its lower end shaped to correspond to the shape of said anvil, releasing means for said weight mounted on said frame whereby on release of said weight it slides down the anvil bar due to gravity so that the recess of the weight and the anvil form a tight fit, with the energy produced causing said test bar to stretch and fracture, and means mounted on said frame for measuring the residual energy of the weight and the anvil bar including the anvil after said test bar has been fractured.

2. Apparatus according to claim 1 wherein the weight is cylindrical and the means for measuring the residual energy after the test bar has been stretched and fractured comprises an air cylinder, having an internal diameter slightly larger than the external diameter of the weight, into which the weight falls and acts like a piston.

3. Apparatus according to claim 2 further including a pen arm attached to the weight and a chart mounted adjacent the air cylinder whereby the distance to which the weight and anvil plunge within the cylinder may be recorded.

4. Apparatus for determining the ultimate tensile strength, effective ductility and reduction in area of steel and the like comprising a rigid frame having an upper suspension bar from which a test bar is adapted to depend, an anvil bar having a tapered anvil at its lower end adapted to be connected to the lower end of said test bar, an annular weight slidably mounted on said anvil bar and slidable therealong and releasably supported on said frame at a predetermined distance from said tapered anvil, said weight being provided with a taper bush at its lower end shaped to correspond to the shape of said anvil, releasing means for said weight pivotally mounted on said frame whereby on release of said weight it slides down the anvil bar due to gravity so that the taper bush of the weight and the tapered anvil form an air-tight fit, with the energy produced causing said test bar to stretch and fracture, and means mounted on said frame for measuring the residual energy of the weight and anvil bar including the anvil after said test bar has been fractured.

5. Apparatus as defined in claim 4 in which the means for measuring residual energy after the test bar has been stretched and fractured comprises an air cylinder, having an internal diameter slightly larger than the external diameter of the weight, into which the weight falls and acts like a piston.

ARTHUR CECIL VIVIAN.

References Cited in the file of this patent

UNITED STATES PATENTS

| Number | Name | Date |
| --- | --- | --- |
| 2,323,724 | Nadai et al. | July 6, 1943 |
| 2,362,589 | Simmons | Nov. 14, 1944 |
| 2,520,979 | Taylor et al. | Sept. 5, 1950 |

FOREIGN PATENTS

| Number | Country | Date |
| --- | --- | --- |
| 248,888 | Great Britain | Mar. 18, 1926 |
| 572,749 | Germany | Mar. 22, 1933 |